(12) United States Patent
Puzio

(10) Patent No.: US 7,806,636 B2
(45) Date of Patent: Oct. 5, 2010

(54) DEAD SPINDLE CHUCKING SYSTEM WITH SLIDING SLEEVE

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 1060 days.

(21) Appl. No.: 11/508,994

(22) Filed: Aug. 24, 2006

(65) Prior Publication Data

US 2007/0068692 A1    Mar. 29, 2007

Related U.S. Application Data

(60) Provisional application No. 60/712,403, filed on Aug. 31, 2005.

(51) Int. Cl.
*B23B 31/16* (2006.01)

(52) U.S. Cl. .................. 408/124; 279/60; 279/140; 279/902

(58) Field of Classification Search ................ 408/124; 279/60–65, 140, 902; *B23B 31/16*
See application file for complete search history.

(56) References Cited

U.S. PATENT DOCUMENTS

| 4,085,337 A | | 4/1978 | Moeller | |
|---|---|---|---|---|
| 4,317,578 A | * | 3/1982 | Welch | 279/60 |
| 4,848,779 A | * | 7/1989 | Wheeler et al. | 279/60 |
| 4,968,191 A | * | 11/1990 | Palm | 408/124 |
| 6,196,554 B1 | | 3/2001 | Gaddis et al. | |
| 6,488,286 B2 | * | 12/2002 | Yaksich | 279/62 |
| 7,021,400 B2 | * | 4/2006 | Oretti | 173/29 |
| 7,455,303 B2 | * | 11/2008 | Draudt et al. | 279/63 |
| 2007/0145693 A1 | * | 6/2007 | Mack | 279/60 |

* cited by examiner

*Primary Examiner*—Eric A Gates
(74) *Attorney, Agent, or Firm*—Capitol City TechLaw

(57) ABSTRACT

A power driver may include a housing, a tool chuck and a sleeve. The tool chuck may have a chuck body mounted for rotation on the housing and supporting threadless chuck jaws, and a chuck drive shaft mounted for rotation on the chuck body. The sleeve may be mounted on the tool chuck for adjustment into a DRILL DRIVE MODE to rotationally lock together the chuck body and the chuck drive shaft, and a CHUCK MODE to rotationally lock together the chuck body and the housing.

17 Claims, 10 Drawing Sheets

DEAD SPINDLE CHUCKING SYSTEM WITH SLIDING SLEEVE

CROSS REFERENCE TO RELATED APPLICATIONS

This US non-provisional application claims priority under 35 USC §119 to U.S. Provisional Application No. 60/712,403 filed Aug. 31, 2005, the content of which is incorporated herein in its entirety by reference.

BACKGROUND

1. Field of the Invention

The present invention relates in general to tool chucks for attachment of accessories to power drivers, and more particularly to a tool chuck having chuck jaws that may be actuated via power from the driver's transmission.

2. Description of Related Art

Commonly-assigned, provisional Application, entitled "TOOL CHUCK WITH POWER TAKE OFF AND DEAD SPINDLE FEATURES," filed Apr. 19, 2005, and designated U.S. Application No. 60/672,503 ("the '503 application"), is hereby incorporated in its entirety by reference. The '503 application describes examples of a power driver that may be selectively operated in different modes, including a chuck mode. In the chuck mode, the driver may be powered up to actuate (i.e., open and close) the tool chuck. During chuck actuation, the chuck body and the chuck jaws may not rotate. This may be referred to as a "dead spindle" feature since the user may not be exposed to (or observe) any rotating parts.

Tool chucks may implement a sliding sleeve that may be selectively grounded (i.e., rotationally fixed) to the housing of the power driver. When the sleeve is grounded, the driver may be powered up to actuate the tool chuck. In some cases, the sleeve may selectively ground the chuck body to the housing of the power driver. Here, the chuck body and the chuck jaws may not rotate during chuck actuation, thereby affecting a dead spindle feature.

Conventional sliding sleeve tool chucks are generally thought to provide acceptable performance. However, if the chuck body is selectively grounded to the housing of the power driver and if the motor is run in the forward direction until the chuck jaws are tightened onto the accessory, then the motor may stall. The motor may also stall when the tool chuck is driven to a fully opened condition. Motor stall may damage the motor, damage the transmission and/or result in erratic tightening torques.

Various features have been developed in an effort to avoid the shortcomings noted above. For example, the power driver may implement an electronic clutch. Here, when the sliding sleeve selectively engages the housing of the power driver, the electronic clutch may be enabled to limit the applied torque to a desired tightening torque (during chuck actuation). Alternatively, the power driver's mechanical clutch, which typically limits the applied torque during a drill/drive mode, may be adapted to also limit an applied torque to a desired tightening torque (during chuck actuation).

The electronic and mechanical clutch features noted above are not without shortcomings. For example, power drivers may be equipped with multiple operating speeds. Unless the electronics can determine and compensate for the selected operating speed, then the torque delivered by the electronic clutch may vary during chuck actuation. The same may be true where the power driver's mechanical clutch serves to limit an applied torque to a desired tightening torque during chuck actuation.

SUMMARY

According to an example, non-limiting embodiment, a power driver may include a housing and a tool chuck. The tool chuck may have a chuck body mounted for rotation on the housing and supporting threadless chuck jaws, and a chuck drive shaft mounted for rotation on the chuck body. A sleeve may be mounted on the tool chuck for adjustment into a DRILL DRIVE MODE to rotationally lock together the chuck body and the chuck drive shaft, and a CHUCK MODE to rotationally lock together the chuck body and the housing.

According to another example, non-limiting embodiment, a power driver may include a housing and a tool chuck. The tool chuck may have a chuck body supporting threadless chuck jaws, and a chuck drive shaft mounted for rotation on the chuck body. Sleeve means may be provided for adjusting into a DRILL DRIVE MODE to rotationally lock together the chuck body and the chuck drive shaft, and a CHUCK MODE to rotationally lock together the chuck body and the housing.

According to another example, non-limiting embodiment, a power driver may include a housing. An input shaft may be mounted for rotation on the housing, and an output shaft may be mounted for rotation on the housing A tool chuck may be mounted on the output shaft. A sleeve may be mounted on the tool chuck. The sleeve may be adjustable from a first axial position to a second axial position to drive the input shaft away from the output shaft.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

The present invention will become more fully understood from the detailed description below and the accompanying drawings, wherein like elements are represented by like reference numerals, which are given by way of illustration only and thus are not limiting of the present invention.

DETAILED DESCRIPTION OF EMBODIMENTS

I. Example Embodiment Depicted in FIGS. 1-8

FIGS. 1-8 schematically show an example, non-limiting embodiment of a chucking system. The chucking system may include a tool chuck 50 that may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

Figure 1:
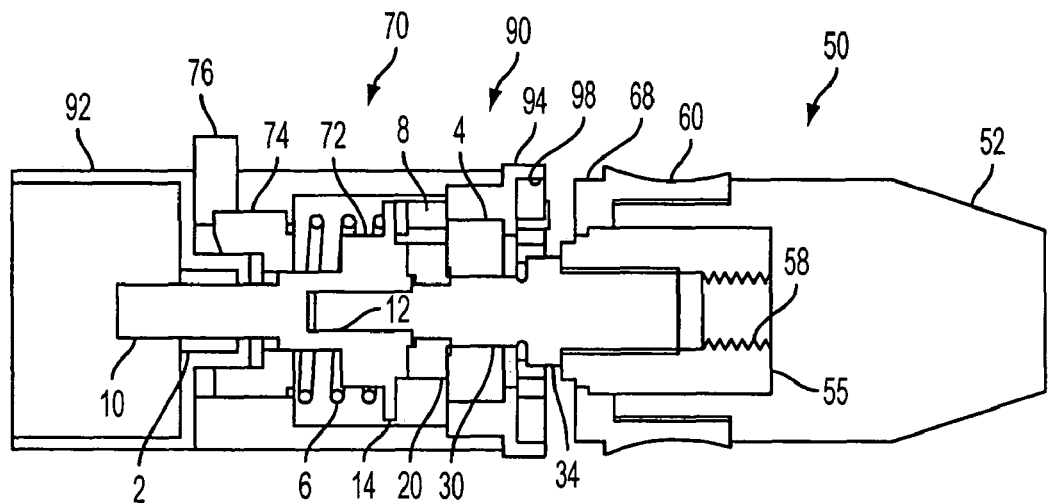
FIG. 1 is a sectional view of a chucking system in a drill/drive mode according to an example, non-limiting embodiment of the present invention.
Figure 2:
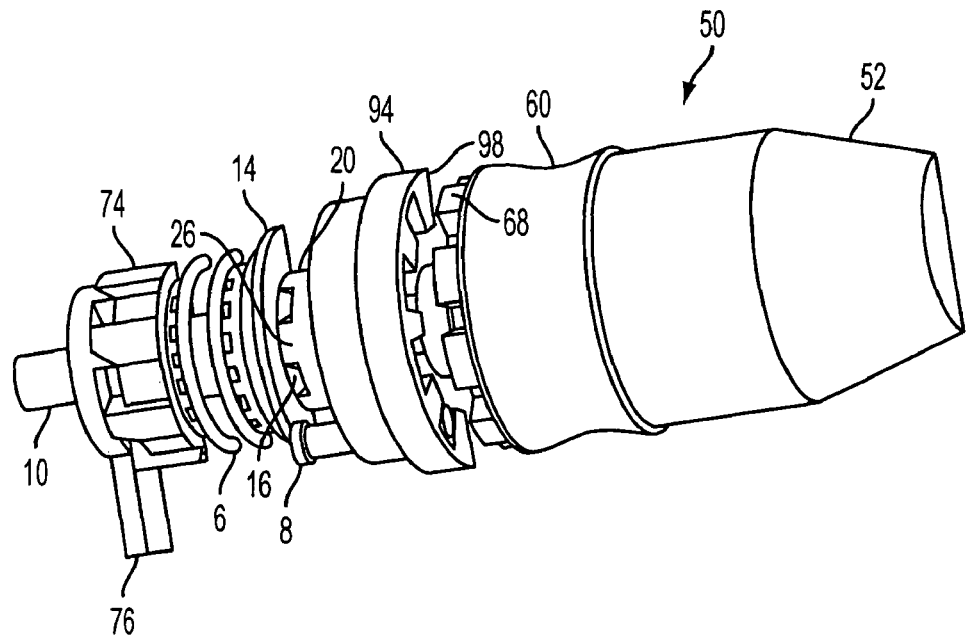
FIG. 2 is a partial perspective view of the chucking system of FIG. 1.

A. The Structure:

As shown in FIGS. 1 and 2, the tool chuck 50 may include a chuck body 52 that may support a chuck drive shaft 55, a sleeve 60 and chuck jaws (not shown). The chuck drive shaft 55 may be mounted for rotation on the chuck body 52. The chuck drive shaft 55 may be securely connected to an output shaft 30 of the power driver. A relative rotation between the chuck drive shaft 55 and the chuck body 52 may actuate the tool chuck 50 (i.e., open and close the chuck jaws).

For example, the tool chuck 50 may implement "pusher" style chuck jaws (not shown). Here, the forward end of the chuck drive shaft 55 may be provided with radial inward facing threads 58. Similar to the structure described in the '503 application, the radial inward facing threads 58 may interact with radial outward facing threads of a chuck actuating screw (not shown), which may support the chuck jaws. The interaction between the threads 58 of the chuck drive shaft 55 and the threads of the chuck actuating screw may cause the chuck jaws to advance and retract in the axial direction relative to the chuck body 52. It will be appreciated that the chuck actuating screw and the chuck body 52 may be rotationally locked together via the chuck jaws.

The sleeve 60 and the chuck body 52 may have cooperating features by which the component parts 52, 60 may be axially moveable relative to each other and rotationally locked together. For example, the sleeve 60 may have forward splines 63 (see FIG. 8) that may interact with splines 53 of the chuck body 52. The sleeve 60 may have rearward splines 66 (see FIG. 7) for selectively engaging with splines 56 of the chuck drive shaft 55. The sleeve 60 may have sleeve lugs 68 for selectively engaging with pockets 98 of an end cap 94.

The power driver may include a housing 90. The housing 90 may include a main body 92 and the end cap 94 assembled together. In alternative embodiments, the main body 92 and the end cap 94 may be of an integral, one-piece construction. The housing 90 may support an input shaft 10, the output shaft 30 and a hammer mechanism 70.

The input shaft 10 may be mounted for rotation on the main body 92. A bearing 2 (e.g., a needle bearing) may be provided to facilitate relative rotation between the input shaft 10 and the main body 92. The input shaft 10 may be coupled to the output of a power driver transmission (not shown). Numerous and varied power driver transmissions, which are well known in this art, may be suitably implemented. The forward end of the input shaft 10 may include a blind hole 12. The blind hole 12 may receive an end of the output shaft 30. The input shaft 10 may include a flange 14. An axial forward facing surface of the input shaft 10 may include drive lugs 16 (see FIG. 2). The drive lugs 16 may have distal ends with tapered ramps (see FIG. 8).

The output shaft 30 may be mounted for rotation on the end cap 94. The output shaft 30 may fixedly support a coupler 20. An axial rearward facing surface of the coupler 20 may include driven lugs 26. The driven lugs 26 may have distal ends with tapered ramps (see FIG. 8). The driven lugs 26 of the coupler 20 may interact with the drive lugs 16 of the input shaft 10, as will be described in more detail below. A bearing 4 may be provided to facilitate relative rotation between the output shaft 30 and the end cap 94. The output shaft 30 may be axially moveable through the bearing 4. The axial travel of the output shaft 30 may be limited by the coupler 20 and a flange 34 of the output shaft 30. A spring (not shown) may be provided between the bearing 4 and the flange 34 to influence the output shaft 30 in an axial forward direction relative to the housing 90.

The hammer mechanism 70 may include a rotatable ratchet 72, a rotationally fixed ratchet 74 and a cam ring 76. As shown in FIG. 1, the rotatable ratchet 72 and the input shaft 10 may be of an integral, one-piece construction. In alternative embodiments, the rotatable ratchet 72 and the input shaft 10 may be two separate and distinct pieces that may be fixed together. The rotationally fixed ratchet 74 may be rotationally fixed and axially moveable relative to the main body 92 of the housing 90. The rotationally fixed ratchet 74 may have a central aperture through which the input shaft 10 may extend. The cam ring 76 may include a user operable lever or sleeve for selectively engaging the ratchets 72, 74.

A spring 6 may be provided between the rotationally fixed ratchet 74 and the flange 14 of the input shaft 10. The spring 6 may influence the rotationally fixed ratchet 74 in an axial rearward direction and into operable engagement with the cam ring 76. The axial rearward travel of the rotationally fixed ratchet 74 may be limited by the cam ring 76. The spring 6 may also influence the input shaft 10 (and thus the rotatable ratchet 72) in an axial forward direction. The axial forward travel of the input shaft 10 may be limited by the coupler 20.

The pins 8 may be slidably mounted in respective axial apertures (not shown) provided around the circumference of the end cap 94. The forward ends of the pins 8 may extend into the pockets 98 of the of the end cap 94.

B. The Operation:

The tool chuck 50 may operate differently depending on (1) the axial position of the rotationally fixed ratchet 74 and (2) the axial position of the sleeve 60. The different operating modes may include (but are not limited to) a DRILL/DRIVE MODE, a HAMMER MODE and a CHUCK MODE.

FIGS. 1 and 2 illustrate the DRILL/DRIVE MODE and with the chucking system unbiased. As shown, the rotationally fixed ratchet 74 may be in an axial rearward position (and disengaged from the rotatable ratchet 72) so that the hammer mechanism 70 may be inactive. Also, the sleeve 60 may be in an axial forward position. In this condition, the splines 56 (FIG. 7) of the chuck drive shaft 55 may engage with the rearward splines 66 of the sleeve 60 so that the chuck body 52, the chuck drive shaft 55 and the sleeve 60 may be rotationally locked together and rotatable together as a unit. Since the chuck body 52 and the chuck drive shaft 55 may be rotationally locked together, the tool chuck 50 may not loosen during operation.

A user may then power up the driver to rotationally drive the input shaft 10, which may rotate relative to the rotationally fixed ratchet 74. The input shaft 10 may rotationally drive the output shaft 30 via the engagement between the drive lugs 16 and the driven lugs 26. By virtue of the influence from the spring 6, the tapered ramps of the drive lugs 16 may be inserted into the coupler 20 beyond the tapered ramps of the driven lugs 26. In this condition, a torque coupling may be provided in which all of the torque from the input shaft 10 may be transmitted to the output shaft 30. The output shaft 30 may rotationally drive the tool chuck 50.

Figure 3:
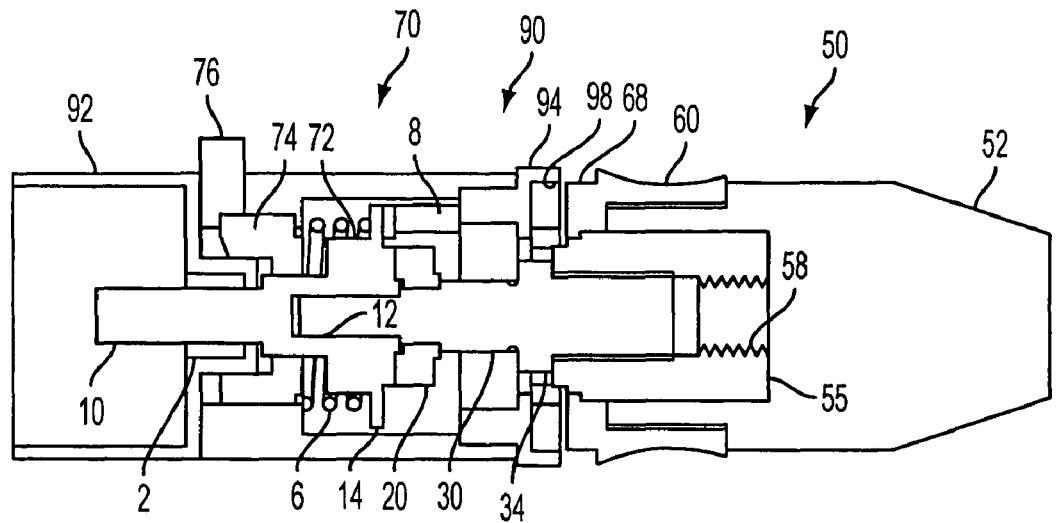
FIG. 3 is a sectional view of the chucking system of FIG. 1 in the drill/drive mode and with bias.
Figure 4:
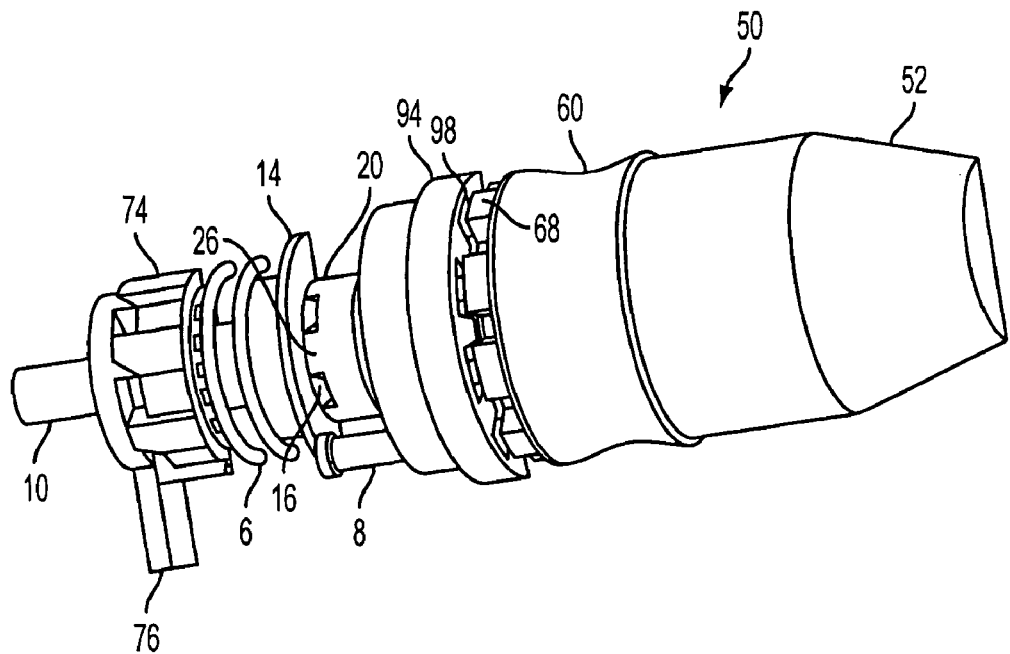
FIG. 4 is a partial perspective view of the chucking system of FIG. 3.

FIGS. 3 and 4 illustrate the DRILL/DRIVE MODE similar to FIGS. 1 and 2, but with the chucking system biased. A bias (or external force) may occur, for example, when the user presses the accessory (e.g., a drill bit) against a work piece. As shown, the bias may move the tool chuck 50 (and thus the output shaft 30 and the input shaft 10) in an axial rearward direction relative to the housing 90 and against the influence of the spring (not shown) provided between the bearing 4 and the flange 34 of the output shaft 30 and against the influence of the spring 6.

The axial rearward travel of the output shaft 30 (and thus the tool chuck 50) may be limited by the flange 34 abutting against the bearing 4. In this way, the axial rearward travel of the component parts due to bias may be limited so that the rotatable ratchet 72 may remain spaced apart from the rotationally fixed ratchet 74 (i.e., the hammer mechanism 70 may remain inactive) and the sleeve 60 may remain spaced apart from the end cap 94. Once the bias is removed, the component parts may return to the condition shown in FIGS. 1 and 2.

Figure 5:
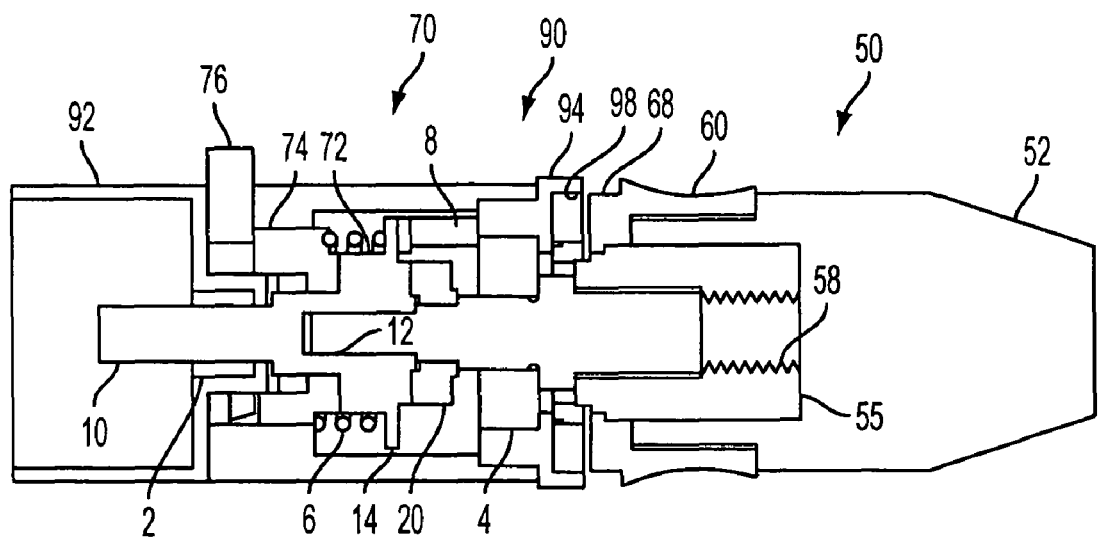
FIG. 5 is a sectional view of the chucking system of FIG. 1 in a hammer mode and with bias.
Figure 6:
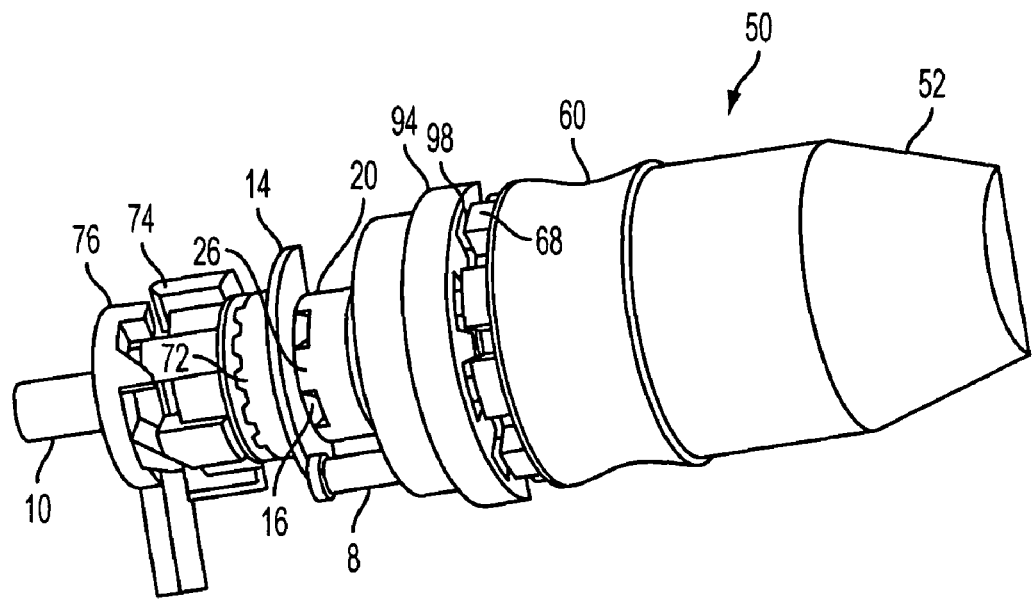
FIG. 6 is a partial perspective view of the chucking system of FIG. 5.

FIGS. 5 and 6 illustrate a HAMMER MODE, and with the chucking system biased. To achieve the HAMMER MODE, a user may manipulate the cam ring 76 to move the rotationally fixed ratchet 74 in an axial forward direction and against the influence of the spring 6. And since the chucking system is biased, the output shaft 30 (by virtue of the coupler 20) may move the input shaft 10 (and thus the rotatable ratchet 72) in an axial rearward direction and against the influence of the spring 6. In this condition, the rotationally fixed ratchet 74 may engage with the rotatable ratchet 72. It will be appreciated that if the bias is removed from the chucking system, then the spring 6 may influence the rotatable ratchet 72 (and the input shaft 10 and the output shaft 30) to an axial forward position, which may cause the ratchets 72, 74 to become disengaged.

A user may then power up the driver to rotationally drive the input shaft 10 (together with the rotatable ratchet 72), which may rotate relative to the rotationally fixed ratchet 74. Assuming the chucking system remains biased, the relative rotation between the ratchets 72, 74 may cause the input shaft 10, the output shaft 30 and the tool chuck 50 to be displaced relative to the housing 90 to produce a reciprocating axial motion. For example, as shown, the rotatable ratchet 72 and the rotationally fixed ratchet 74 may have respective teeth. As the teeth of the rotatable ratchet 72 ride over the teeth of the rotationally fixed ratchet 74, the rotatable ratchet 72 may be moved axially away from the rotationally fixed ratchet 74. As the teeth pass over each other, the bias applied to the chucking system may move the rotatable ratchet 72 back to the axial position shown in FIGS. 5 and 6. In this way, when the driver is powered up, the tool chuck 50 may rotate and axially reciprocate.

Figure 7:
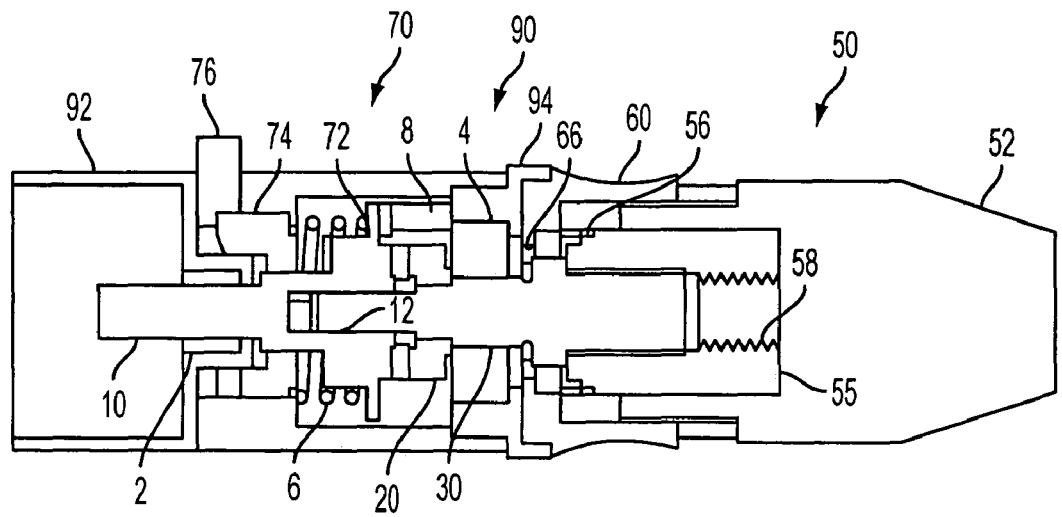
FIG. 7 is a sectional view of the chucking system of FIG. 1 in a chuck mode.
Figure 8:
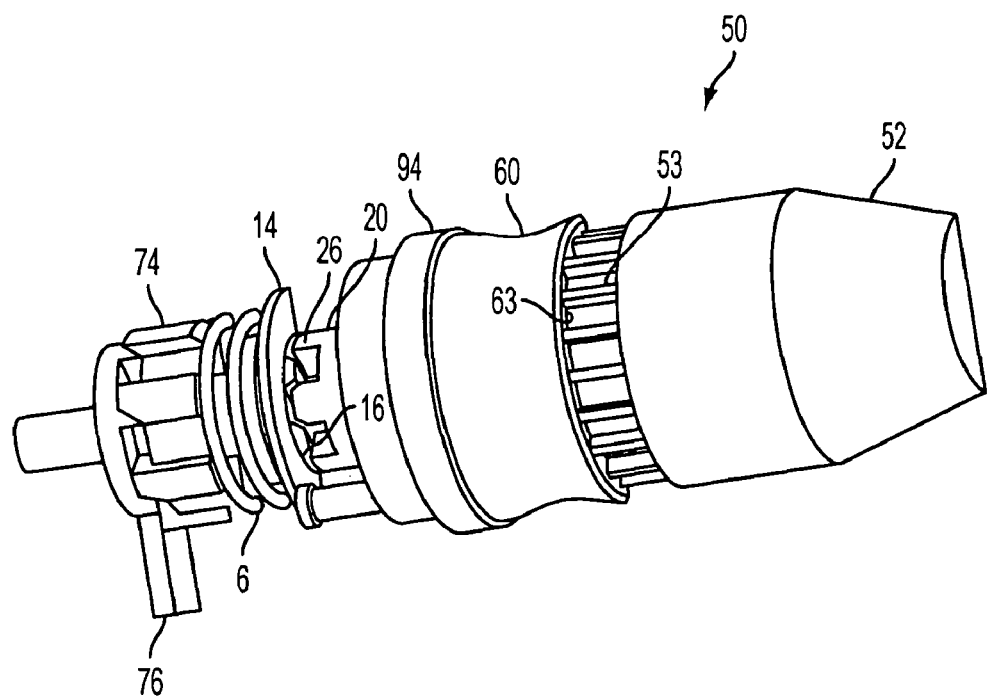
FIG. 8 is a partial perspective view of the chucking system of FIG. 7.

FIGS. 7 and 8 illustrate the CHUCK MODE. By way of example only, the power driver may be operated in the CHUCK MODE with the chucking system unbiased (as shown). The rotationally fixed ratchet 74 may be in an axial rearward position (and disengaged from the rotatable ratchet 72) so that the hammer mechanism 70 may be inactive. Also, the user may move the sleeve 60 to an axial rearward position. During this axial movement, the rearward splines 66 of the sleeve 60 may disengage from the splines 56 of the chuck drive shaft 55 (so that the chuck drive shaft 55 may be rotatable relative to the chuck body 52), and the sleeve lugs 68 may enter into the pockets 98 of the end cap 94 (so that the sleeve 60 and the chuck body 52 may be rotationally grounded to the housing 90 of the power driver).

As the sleeve lugs 68 enter into the pockets 98, the sleeve lugs 68 may drive the pins 8 (and thus the input shaft 10) in an axial rearward direction and against the influence of the spring 6. The output shaft 30 (and thus the coupler 20) may remain in an axial forward position by virtue of the spring (not shown) provided between the flange 34 and the bearing 4. Accordingly, the axial rearward travel of the input shaft 10 may cause the drive lugs 16 to partially withdraw from the driven lugs 26 of the coupler 20 so that the tapered ramps of the drive lugs 16 may confront the tapered ramps of the driven lugs 26 in a circumferential direction (as shown in FIG. 8).

A user may then power up the driver to rotationally drive the input shaft 10. The input shaft 10 may rotationally drive the output shaft 30 via the engagement between the drive lugs 16 and the driven lugs 26. The output shaft 30 may rotationally drive the chuck drive shaft 55 relative to the chuck body 52 (which may remain rotationally grounded to the housing 90 via the sleeve 60). As described in the '503 application, the relative rotation between the chuck drive shaft 55 and the chuck body 52 (and thus the chuck actuating screw and the chuck jaws) may actuate the tool chuck 50 (i.e., open and/or close the chuck jaws depending on the operational direction of the power driver). Further, during chuck actuation, the chuck body and the chuck jaws may not rotate. This may be referred to as a "dead spindle" feature since the user may not be exposed to (or observe) any rotating parts.

During a chuck actuating process, and when the tool chuck 50 is not fully opened or closed (e.g., when the chuck jaws are still opening or closing), the input shaft 10 may rotationally drive the output shaft 30 via the interaction between the drive lugs 16 and the driven lugs 26. When the tool chuck 50 fully closes (with or without an inserted accessory) or fully opens, a rotational force applied by the drive lugs 16 to the driven lugs 26 may increase. The rotational force may increase to a threshold at which the tapered ramps of the lugs 16, 26 may cooperate to drive the input shaft 10 in an axial rearward direction and against the influence of the spring 6 so that the drive lugs 16 may slide over and past the distal ends of the driven lugs 26. In this way, the drive lugs 16 and the driven lugs 26 may provide a clutch feature to limit the torque that may be applied during the chuck actuating process.

It will be appreciated that the magnitude of the rotational force necessary to drive the input shaft 10 in the axial rearward direction may be affected by, for example, the degree to which the tapered ramps of the lugs 16, 26 are inclined (or slanted) and/or the spring constant of the spring 6. Further, by suitably designing the profiles of the tapered ramps, a torque threshold for tightening the tool chuck 50 may be less than a torque threshold for loosening the tool chuck 50, or vice-versa.

II. Example Embodiment Depicted in FIGS. 9-14

FIGS. 9-14 schematically show an example, non-limiting embodiment of a tool chuck 150 that may be suitably implemented in the chucking system described above in section I. As shown in FIGS. 9-14, the tool chuck 150 may removably receive the shank of an accessory 105.

Figure 9:
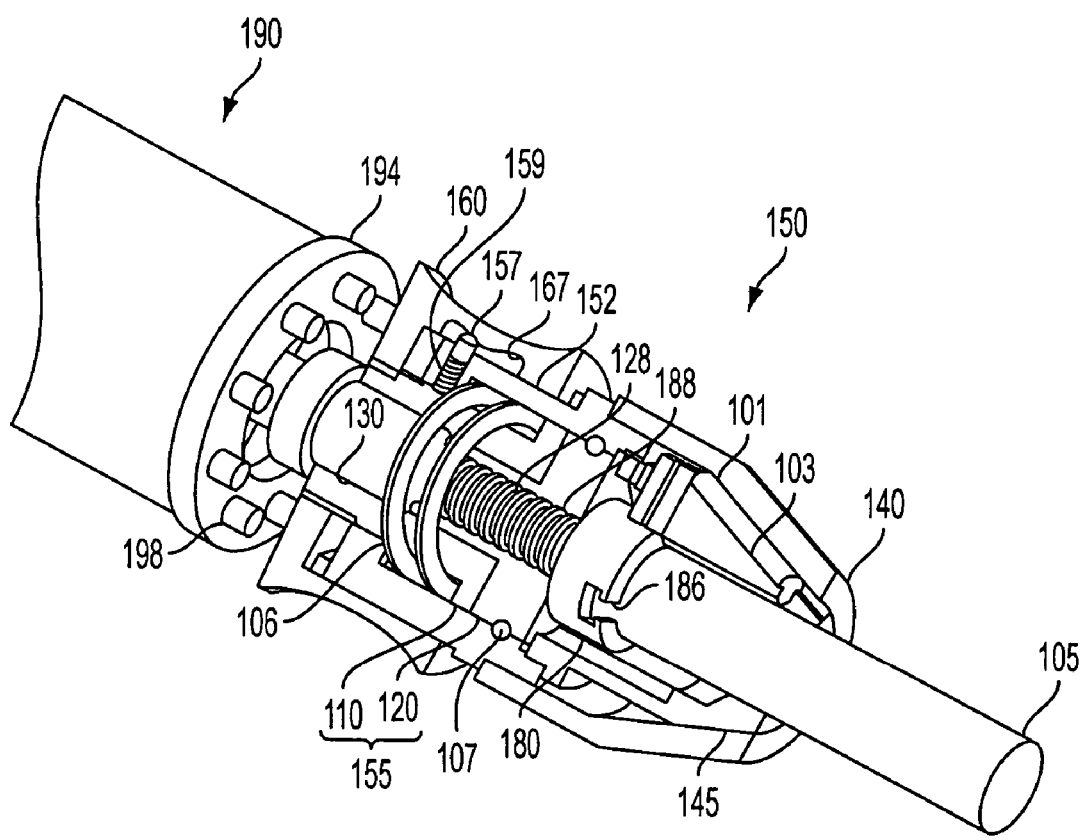
FIG. 9 is a partial perspective view of a tool chuck in a drill/drive mode according to an example non-limiting embodiment of the present invention.
Figure 10:
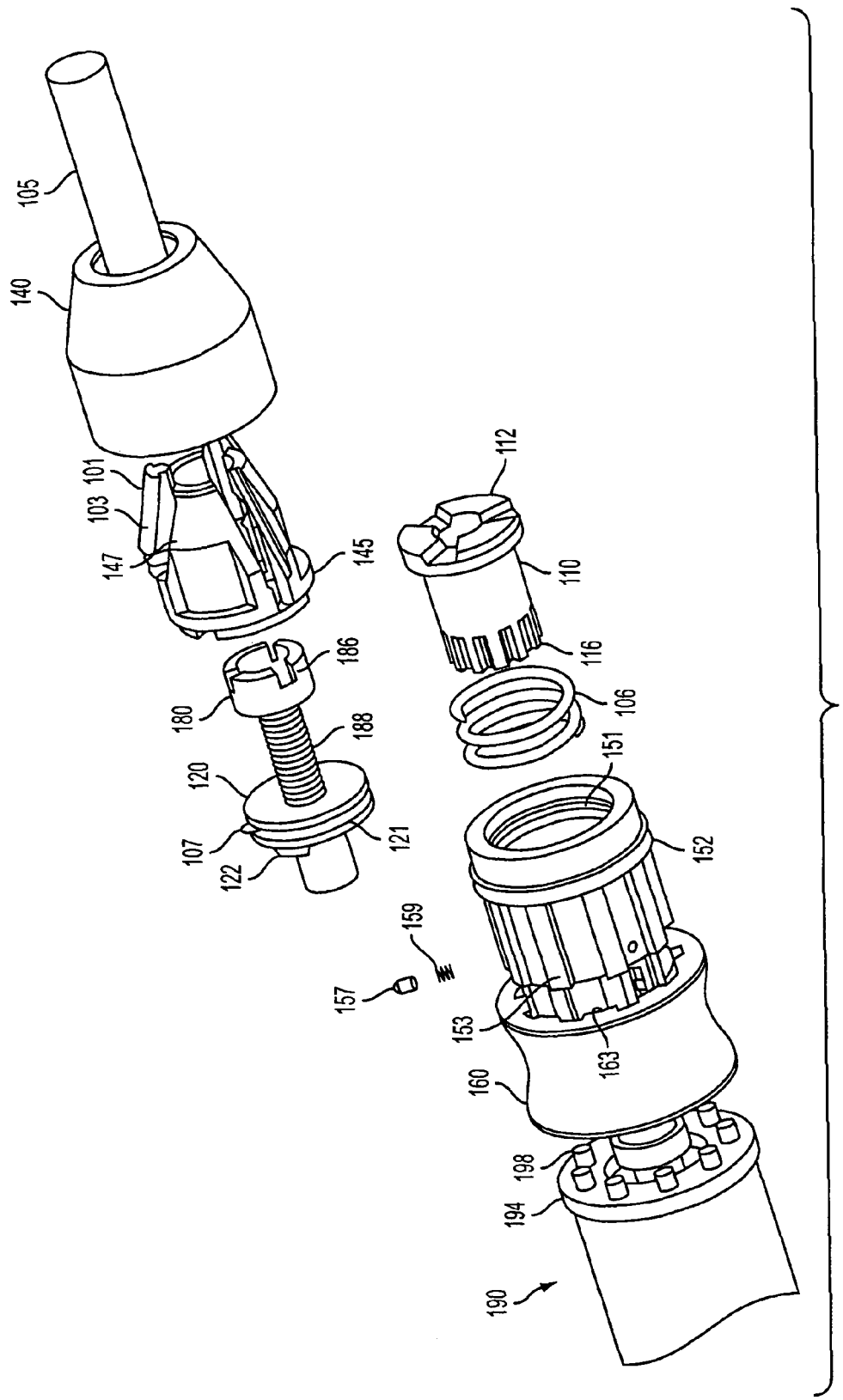
FIGS. 10 and 11 are exploded perspective view of the tool chuck of FIG. 9.
Figure 11:
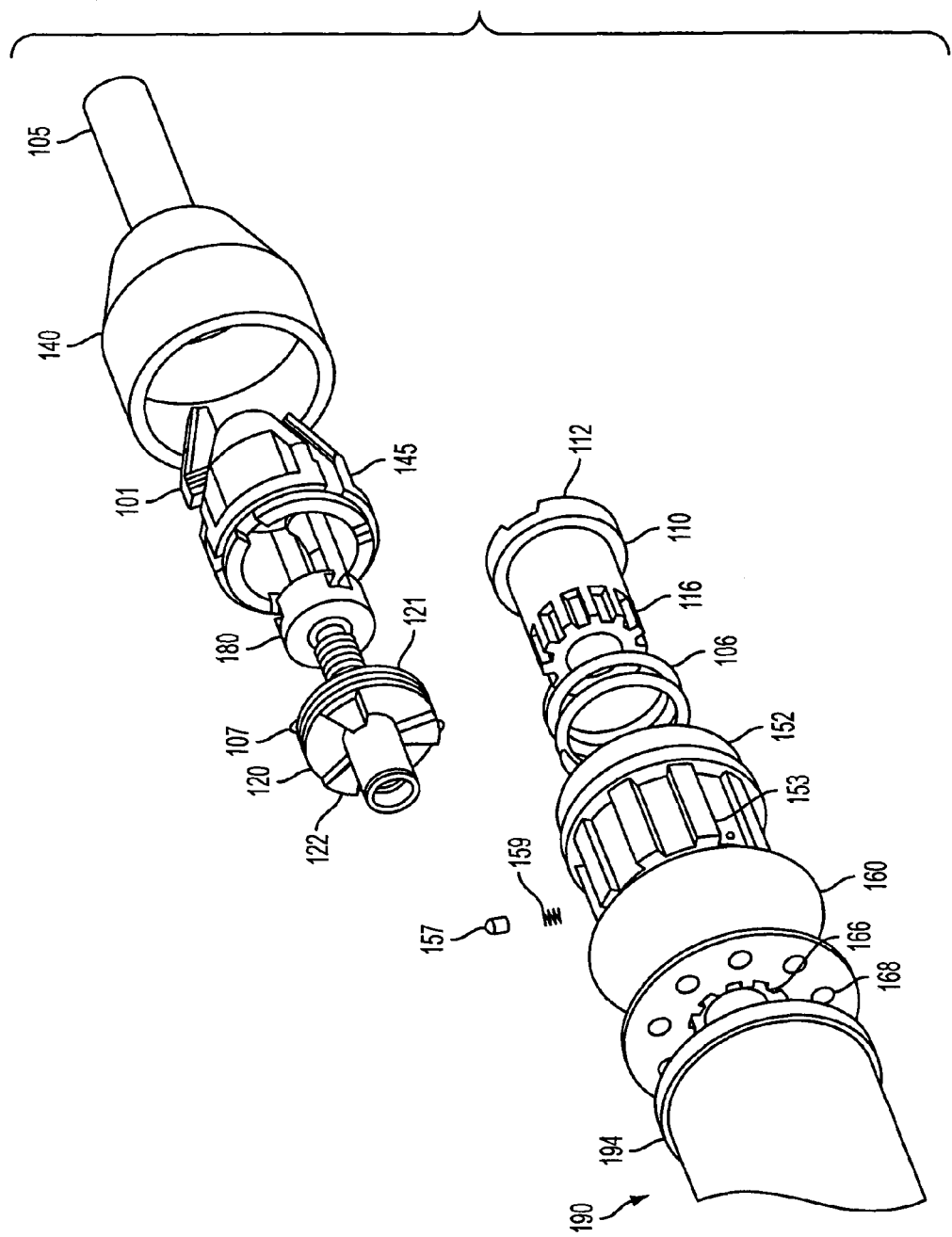

A. The Structure:

As shown in FIGS. 9-11, the tool chuck 150 may include a chuck body 152. The chuck body 152 may rotatably support a chuck drive shaft 155. In this example, non-limiting embodiment, the chuck drive shaft 155 may have two component parts inclusive of a bushing 110 and a drive sleeve 120. The bushing 110 may be securely connected to the output shaft 130 of the power driver. The bushing 110 may include splines 116 (see FIG. 10) that may selectively cooperate with rearward splines 166 (see FIG. 11) of a sleeve 160. The bushing 110 may also include a forward facing clutch surface 112 (see FIG. 10) that may cooperate with a rearward facing clutch surface 122 (see FIG. 11) of the drive sleeve 120.

The drive sleeve 120 may be axially fixed to the chuck body 152. Bearings 107 (e.g., ball bearings) may be interposed between the drive sleeve 120 and the chuck body 152 to facilitate a relative rotation between the component parts 120, 152. The bearings 107 may be cojoined via a carrier (for example) or they may be loose. The bearings 107 may be captured between annular recesses 151, 121 (see FIG. 10) that may be respectively provided in the chuck body 152 and the drive sleeve 120. The drive sleeve 120 may be provided with radial inward facing threads 128. The radial inward facing threads 128 may interact with radial outward threads 188 of a chuck actuating screw 180. That is, the drive sleeve 120 may be screw coupled to the chuck actuating screw 180.

A spring 106 may be captured between the chuck body 152 and the bushing 110 (which may be securely connected to the output shaft 130). The spring 106 may influence the chuck body 152 (and therefore the drive sleeve 120) in an axial rearward direction. The axial rearward travel of the chuck body 152 may be limited by the clutch surface 122 of the drive sleeve 120 abutting against the clutch surface 112 of the bushing 110.

The chuck actuating screw 180 may include radial passageways 186 through which the chuck jaws 101 may be respectively slidable. The radial passageways 186 may rotationally fix the chuck actuating screw 180 to the chuck jaws 101. The interaction between the threads 128 and 188 may cause the chuck actuating screw 180 to advance and retract in the axial direction relative to the chuck body 152.

The forward end of the chuck body 152 may securely support a nose portion 140 and a jaw retainer 145. The nose portion 140 may have a tapered shape and may surround the jaw retainer 145. The jaw retainer 145 may have inclined slots 147 (see FIG. 10) through which the chuck jaws 101 may be respectively slidable. The chuck jaws 101 may have fins 103 that may slide along the tapered outer contour of the jaw retainer 145. The radial inward facing surface of the nose portion 140 may abut against the radial outward facing surface of the fins 103 to prevent the chuck jaws 101 from being removed from the slots 147 of the jaw retainer 145. It will be appreciated that the chuck actuating screw 180, the nose portion 140 and the jaw retainer 145 may be rotationally locked together via the chuck jaws 101.

The sleeve 160 may be mounted on the chuck body 152 via cooperating features by which the component parts 152, 160 may be axially moveable relative to each other and rotationally locked together. For example, the sleeve 160 may have forward splines 163 (see FIG. 10) that may interact with splines 153 (see FIG. 10) of the chuck body 152. The sleeve 160 may have pockets 168 (see FIG. 11) for selectively engaging with lugs 198 of the housing 190.

The axial position of the sleeve 160 (relative to the chuck body 152) may be influenced by a detent 157. In varied embodiments, a plurality of detents 157 may be provided. The detent 157 may be biased in a radial outward direction by a spring 159. The detent 157 and the spring 159 may be received in a pocket of the chuck body 152. The detent 157 may interact with a recess 167 of the sleeve 160 to influence the axial position of the sleeve 160, as will be described in more detail below.

B. The Operation:

The tool chuck 150 may operate differently depending on the axial position of the sleeve 160. The different operating modes may include (but are not limited to) a DRILL/DRIVE MODE, an ASSEMBLY MODE and a CHUCK MODE.

Figure 12:
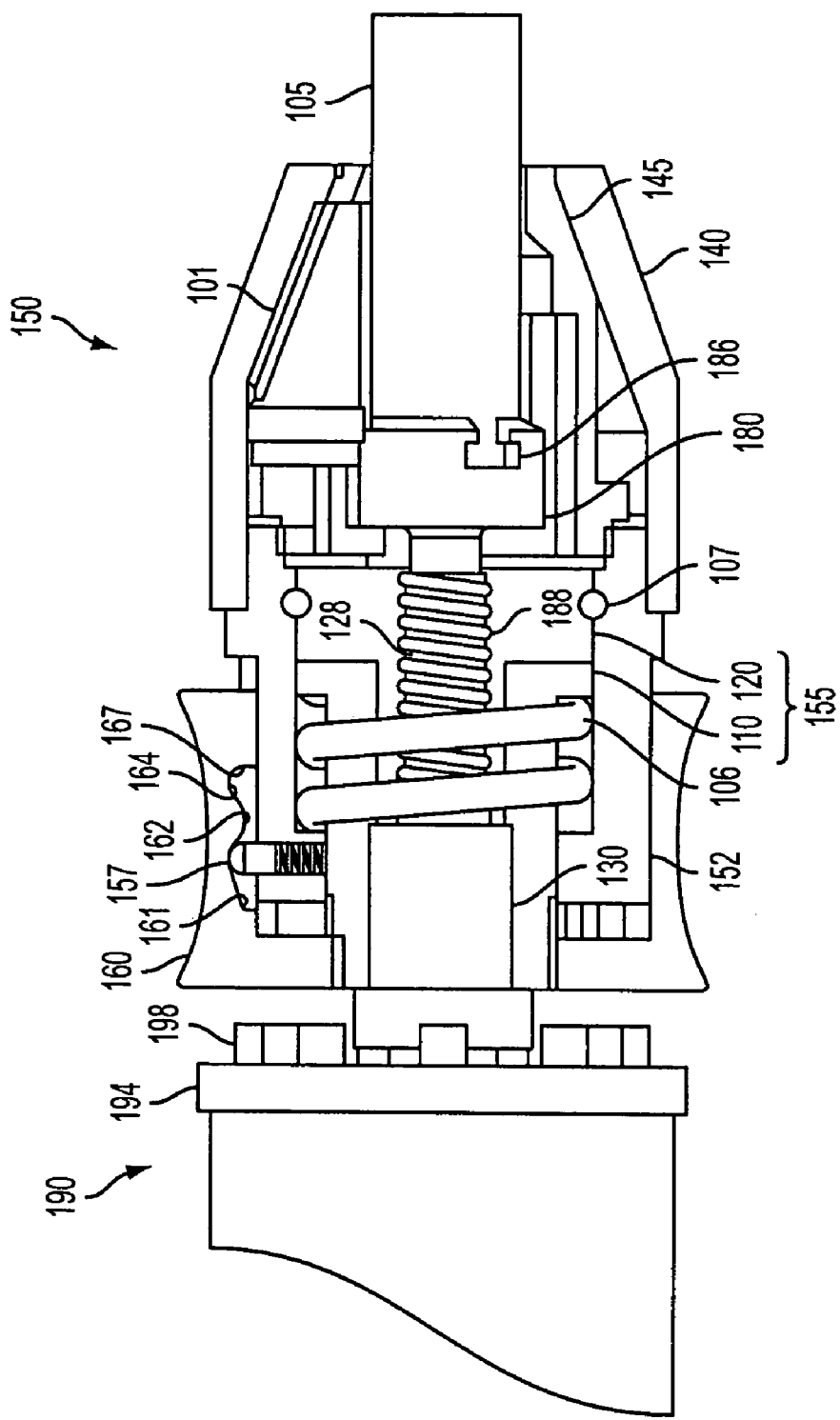
FIG. 12 is a sectional view of the tool chuck of FIG. 9 in a drill/drive mode.

FIG. 12 illustrates the DRILL/DRIVE MODE. As shown, the sleeve 160 may be located at an axial intermediate position relative to the chuck body 152. In this condition, the detent 157 may be situated between two ramps 161 and 162 that may be provided in the recess 167. The axial position of the sleeve 160 may deviate during use. During such deviations, the ramps 161 and 162 and the spring loaded detent 157 may interact to influence the sleeve 160 back to the illustrated axial intermediate position.

In addition, the splines 116 of the bushing 110 may engage with the rearward splines 166 of the sleeve 160 so that the chuck body 152, the chuck drive shaft 155 (inclusive of the bushing 110 and the drive sleeve 120) and the sleeve 160 may be rotationally locked together and rotatable together as a unit. Thus, the tool chuck 150 may not loosen during operation.

A user may then power up the driver to rotationally drive the output shaft 130, which in turn may rotationally drive the tool chuck 150 and the accessory 105.

Figure 13:
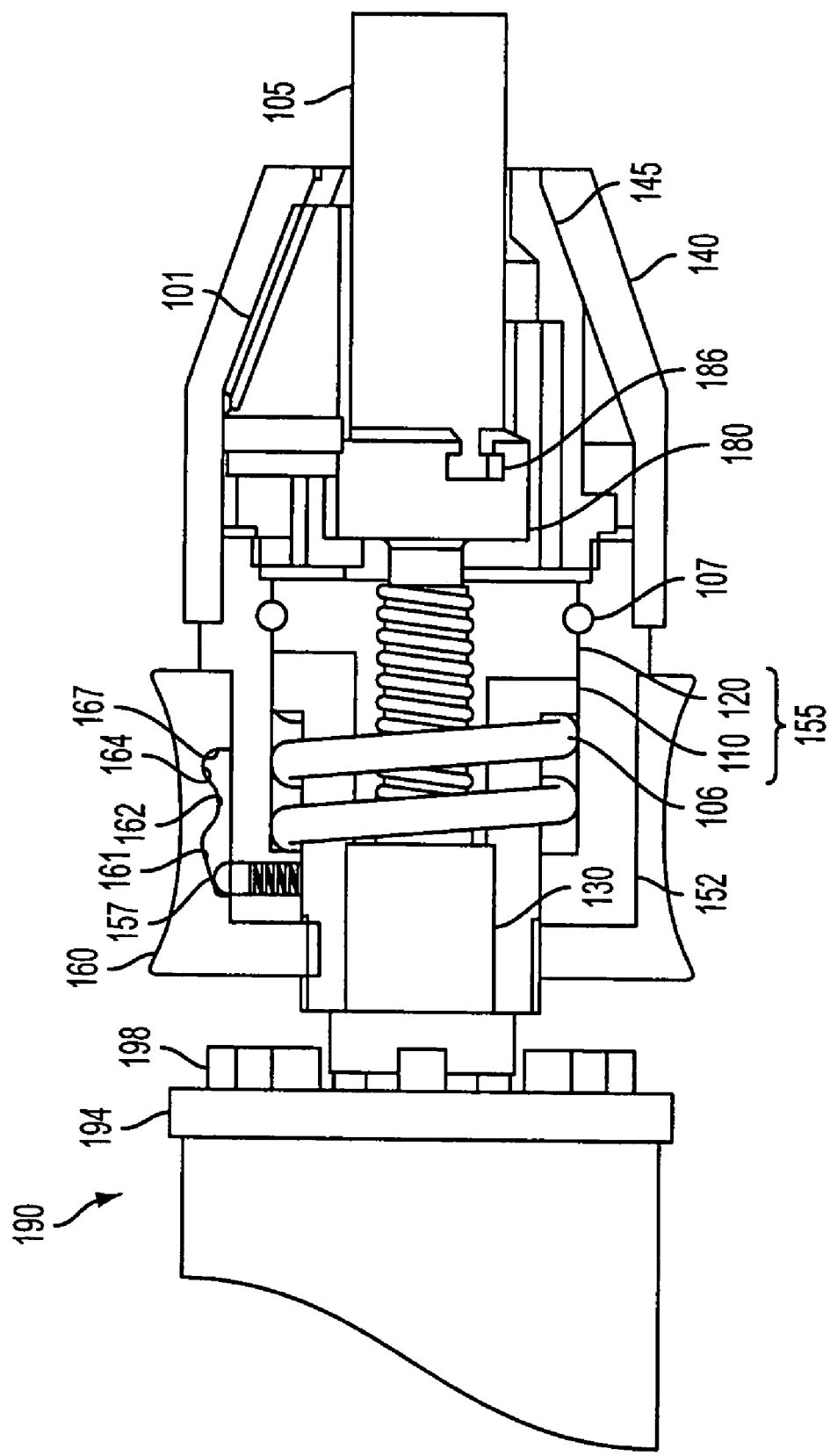
FIG. 13 is a sectional view of the tool chuck of FIG. 9 in an assembly mode.

FIG. 13 illustrates an ASSEMBLY MODE. To achieve the ASSEMBLY MODE, a user may move the sleeve 160 to an axial forward position. During this axial movement, the ramp 161 of the recess 167 may drive the detent 157 in a radial inward direction and against the influence of the spring 159. The sleeve 160 may be actively retained in the axial forward position so that a portion of the bushing 110 may be exposed.

The exposed portion of the bushing 110 may be grasped with a tool to allow for assembly (or disassembly) of the tool chuck 150 onto (or from) the output shaft 130 of the power driver. Once the active retention is released, the ramp 161 and the spring loaded detent 157 may interact to influence the sleeve 160 back to the axial intermediate position shown in FIG. 12.

Figure 14:
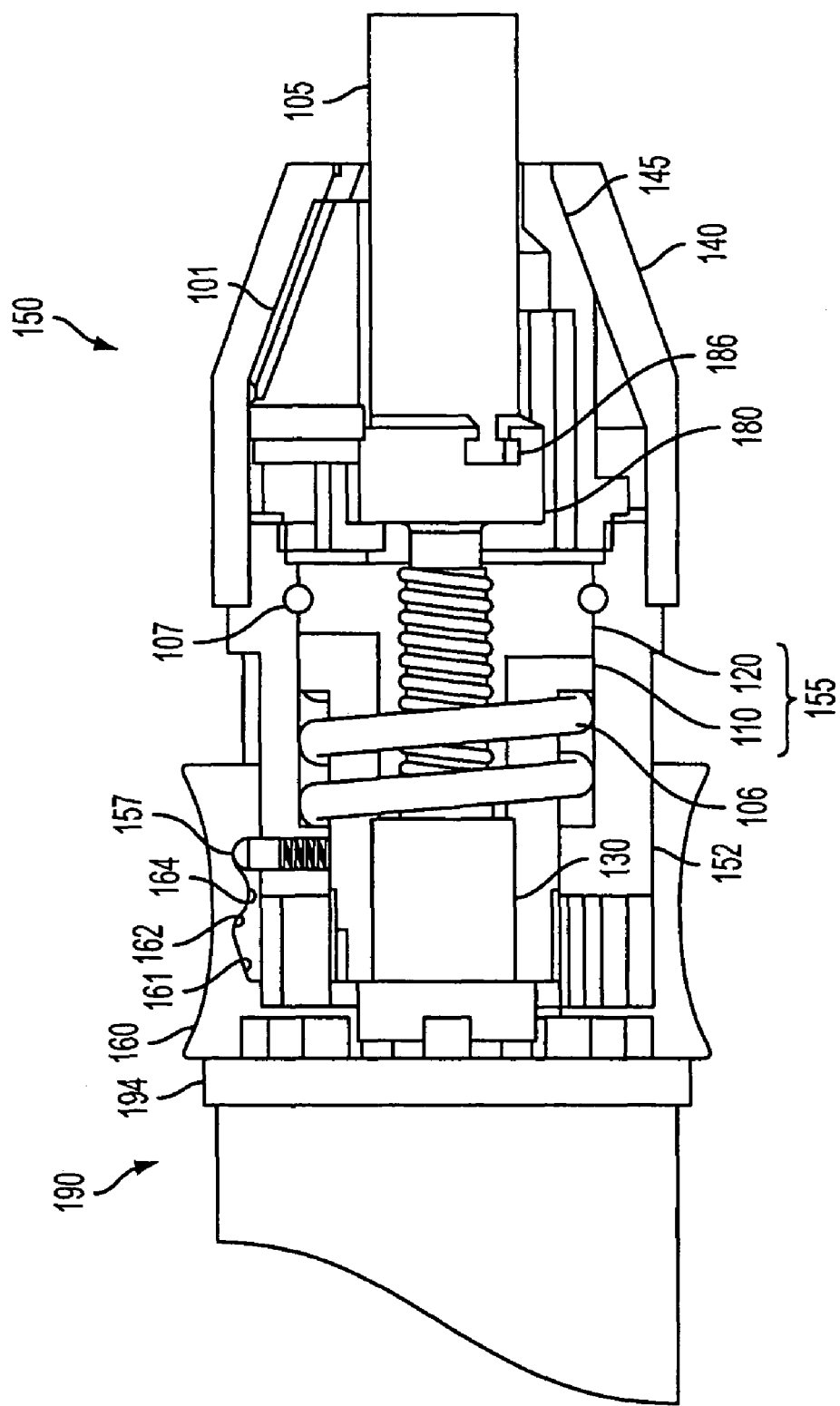
FIG. 14 is a sectional view of the tool chuck of FIG. 9 in a chuck mode.

FIG. 14 illustrates the CHUCK MODE. Here, the user may move the sleeve 160 to an axial rearward position. During this initial axial movement, the ramp 162 of the recess 167 may drive the detent 157 in a radial inward direction and against the influence of the spring 159. During further axial movement, the detent 157 may move in a radial outward direction (by virtue of the spring 159) and across the ramp 164.

In addition, the rearward splines 166 of the sleeve 160 may disengage from the splines 116 of the bushing 110 so that the chuck drive shaft 155 (inclusive of the bushing 110 and the drive sleeve 120) may be rotatable relative to the chuck body 152. The lugs 198 of the end cap 194 may enter into the pockets 168 of the sleeve 160. In this condition, the sleeve 160, the chuck body 52, the nose portion 140, the jaw retainer 145 and the chuck jaws 101 may be rotationally grounded to the housing 190 of the power driver.

A user may then power up the driver to rotationally drive the output shaft 130. The output shaft 130 may rotationally drive the bushing 110. The bushing 110 may rotationally drive the drive sleeve 120 via the engagement between the clutch surfaces 112 and 122. The drive sleeve 120 may rotate relative to the chuck actuating screw 180, which may remain grounded to the housing 190 (via the chuck jaws 101, the nose portion 140, the jaw retainer 145, the chuck body 152 and the sleeve 160). This relative rotation may cause the chuck actuating screw 180 to advance or retract in the axial direction (depending on the rotation direction of the drive sleeve 120) by virtue of the interaction between the radial inward facing threads 128 and the radial outward facing threads 188. The translational movement of the chuck actuating screw 180 may push or pull on the chuck jaws 101 (guided by the inclined slots 147 in the jaw retainer 145) to open or close the same.

During chuck actuation, the sleeve 160, the chuck body 152, the nose portion 140, the jaw retainer 145, the chuck jaws 101 and the chuck actuating screw 180 may remain rotationally grounded to the housing 190, while the chuck actuating screw 180 may move axially (via the rotational movements of the drive sleeve 120) relative to the chuck body 152 to open and close the chuck jaws 101. This may be referred to as a dead spindle feature since the user may not be exposed to (or observe) any rotating parts.

The output shaft 30 may rotationally drive the chuck drive shaft 55 relative to the chuck body 52 (which may remain rotationally grounded to the housing 90 via the sleeve 60). As described in the '503 application, the relative rotation between the chuck drive shaft 55 and the chuck body 52 (and thus the chuck actuating screw and the chuck jaws) may actuate the tool chuck 50 (i.e., open and/or close the chuck jaws depending on the operational direction of the power driver). Further, during chuck actuation, the chuck body and the chuck jaws may not rotate.

During a chuck actuating process, and when the tool chuck 150 is not fully opened or closed (e.g., when the chuck jaws 101 are still opening or closing), the bushing 110 may rotationally drive the drive sleeve 120 via the interaction between the clutch surfaces 112 and 122. When the tool chuck 150 fully closes (with or without the inserted accessory 105) or fully opens, a rotational force applied by the bushing 110 to the drive sleeve 120 may increase. The rotational force may increase to a threshold at which the clutch surfaces 112 and 122 may give way (or slip) to limit the torque that may be applied during the chuck actuating process. As the clutch surfaces 112 and 122 slip, the drive sleeve 120 (together with the chuck body 152 and the sleeve 160) may be driven in an axial forward direction and against the influence of the spring 106. It will be appreciated, however, that the axial forward travel (that occurs during clutch slip) may be insufficient to cause the lugs 198 of the end cap 194 to become disengaged from the pockets of the sleeve 160.

It will be appreciated that the magnitude of the rotational force necessary to drive the drive sleeve 120 in the axial forward direction may be affected by, for example, the geometries of the clutch surfaces 112 and 122 and/or the spring constant of the spring 106. Further, by suitably designing the geometries of the clutch surfaces 112 and 122, a torque threshold for tightening the tool chuck 150 may be less than a torque threshold for loosening the tool chuck 150, or vice versa.

What is claimed is:

1. A power driver comprising:
   a housing;
   a tool chuck having
      a chuck body mounted for rotation on the housing and supporting threadless chuck jaws, and
      a chuck drive shaft mounted for rotation on the chuck body; and
   a sleeve mounted on the tool chuck for adjustment into
      a DRILL DRIVE MODE to rotationally lock together the chuck body and the chuck drive shaft, wherein the sleeve is rotatable relative to the housing, and
      a CHUCK MODE to rotationally lock together the chuck body and the housing.

2. The power driver as set forth in claim 1, wherein the sleeve is coupled to the chuck body via cooperating splines.

3. The power driver as set forth in claim 1, wherein the sleeve in the CHUCK MODE disengages from the chuck drive shaft.

4. The power driver as set forth in claim 1, wherein the chuck drive shaft is mounted inside the chuck body.

5. The power driver as set forth in claim 1, wherein the sleeve is mounted on the outside of the chuck body.

6. A power driver comprising:
   a housing;
   a tool chuck having
      a chuck body supporting threadless chuck jaws, and
      a chuck drive shaft mounted for rotation on the chuck body; and
   sleeve means for adjusting into
      a DRILL DRIVE MODE to rotationally lock together the chuck body and the chuck drive shaft, wherein the sleeve means is rotatable relative to the housing, and
      a CHUCK MODE to rotationally lock together the chuck body and the housing.

7. The power driver as set forth in claim 6, wherein the sleeve means is coupled to the chuck body via cooperating splines.

8. The power driver as set forth in claim 6, wherein the sleeve means in the CHUCK MODE disengages from the chuck drive shaft.

9. The power driver as set forth in claim 6, wherein the chuck drive shaft is mounted inside the chuck body.

10. The power drive as set forth in claim 6, wherein the sleeve means is mounted on the outside of the chuck body.

11. A power driver comprising:
    a housing;
    an input shaft mounted for rotation on the housing;
    an output shaft mounted for rotation on the housing;
    a tool chuck mounted on the output shaft;
    a sleeve mounted on the tool chuck and being adjustable from a first axial position to a second axial position to drive the input shaft in an axial direction relative to the housing and away from the output shaft.

12. The power driver as set forth in claim 11, wherein the tool chuck includes a chuck body that is rotationally locked to the sleeve.

13. The power driver as set forth in claim 11, wherein the sleeve in the first axial position achieves a DRILL DRIVE MODE in which the input shaft and the output shaft are rotationally locked together.

14. The power driver as set forth in claim 11, wherein the sleeve in the first axial position is rotatable relative to the housing.

15. The power driver as set forth in claim 11, wherein the sleeve in the second axial position achieves a CHUCK MODE in which the input shaft is rotatable relative to the output shaft.

16. The power driver as set forth in claim 11, wherein the sleeve in the second axial position is rotationally locked to the housing.

17. The power driver as set forth in claim 11, wherein the tool chuck supports threadless jaws.

* * * * *